(12) United States Patent
Angel et al.

(10) Patent No.: US 11,577,565 B1
(45) Date of Patent: Feb. 14, 2023

(54) TRAILER TONGUE JACK RELOCATION BRACKET

(71) Applicants: Bruce Andrew Angel, Stokesdale, NC (US); Steven L. Spencer, Lawsonville, NC (US)

(72) Inventors: Bruce Andrew Angel, Stokesdale, NC (US); Steven L. Spencer, Lawsonville, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 436 days.

(21) Appl. No.: 16/911,602

(22) Filed: Jun. 25, 2020

(51) Int. Cl.
    *B60D 1/66*      (2006.01)
    *F16M 13/02*      (2006.01)

(52) U.S. Cl.
    CPC ............. *B60D 1/66* (2013.01); *F16M 13/022* (2013.01)

(58) Field of Classification Search
    CPC ........ H01Q 1/1228; B60D 1/665; B60D 1/66; F16M 13/022; F16B 2/065
    See application file for complete search history.

(56) References Cited

U.S. PATENT DOCUMENTS

| | | | |
|---|---|---|---|
| RE43,535 E * | 7/2012 | Roll ....................... | B60D 1/665 |
| | | | 254/424 |
| 9,966,649 B2 * | 5/2018 | Christie ................. | H01Q 1/125 |
| 10,316,511 B1 * | 6/2019 | Chapman ................. | E04B 1/40 |
| 11,007,832 B1 * | 5/2021 | Rebick ..................... | B60D 1/52 |
| 2015/0083875 A1 * | 3/2015 | Lloyd ................. | H01Q 1/1228 |
| | | | 29/428 |

OTHER PUBLICATIONS

Webpage printout from www.casitaclub.com showing a tongue jack relocation kit, dated Feb. 5, 2013.
Webpage printout from americancarcraft.com showing "The Jack Back", Copyright 2020 American Car Craft.

* cited by examiner

*Primary Examiner* — Brian E Glessner
*Assistant Examiner* — Daniel J Kenny
(74) *Attorney, Agent, or Firm* — Tuggle Duggins P.A.; Blake P. Hurt

(57) ABSTRACT

A trailer tongue jack relocation bracket has a frame bracket firmly attached to a central bracket and a frame plate, wherein the central bracket has spaced-apart top and bottom plate members that can be used to mount a trailer tongue jack to the relocation bracket. The frame bracket can be placed on opposite sides of a trailer frame member to sandwich the frame member therebetween, and then bolted together to clamp the relocation bracket to the trailer.

50 Claims, 6 Drawing Sheets

TRAILER TONGUE JACK RELOCATION BRACKET

FIELD OF THE INVENTION

The invention herein relates to a trailer tongue jack in general and more particularly relates to a bracket assembly for use in relocating the tongue jack.

DESCRIPTION OF THE PRIOR ART AND OBJECTIVES OF THE INVENTION

Trailers are extremely common and used for a wide variety of purposes and in a broad array of industries, including movers, landscapers, construction workers and homeowners for both business and recreational uses. While trailers may be configured in a number of different ways for specialized applications, in general the trailer frame has a pair of parallel support beams and cross members used to support the bed of the trailer and a pair of converging arms located at the front of the trailer where the trailer attaches to a tow vehicle. With some trailers, the hitch ball coupler is located at the apex of the converging arms. In others, the hitch ball coupler is attached to the end of a beam extending from the apex toward the tow vehicle. The latter is particularly common in trailers for boats to accommodate for the bow of the boat.

A trailer jack is a device installed on the trailer that is used to raise or lower the hitch ball coupler on the front of the trailer to facilitate attaching and removing the trailer from the tow vehicle. Generally speaking, the jack has a cylindrical housing, a second cylindrical member telescopically connected to the housing, and operatively connected to an actuator arm. Upon rotation of the arm, the second cylindrical member extends or retracts relative to the housing to raise or lower the hitch ball coupler on the front of the trailer. While a trailer jack may not be necessary on small, lightweight trailers that can be coupled and un-coupled by hand, some type of jack is essential on larger and heavier trailers. The trailer jack is usually located just behind the hitch ball coupler. The jack may be fixed in a vertical position or it may be mounted for pivotal movement between the vertical position and a horizontal position used for stowage of the jack. The typical mounting location, directly behind the hitch ball coupler, provides excellent functionality and superior leverage for raising and lowering the hitch ball coupler. However, in that location, the jack prevents lowering a tailgate on a pickup truck or other tow vehicle having a drop-down tailgate, and even some vehicles with lift-up tailgates. This can be a significant inconvenience and potentially a costly one if the tailgate is dented or scratched from contacting the trailer jack.

Trailer jacks can also be purchased separately and affixed to the trailer frame using one or more brackets. The stand-alone trailer jack may be located at any suitable location along the frame and can be placed outside the area of the tailgate, thus avoiding the issue noted above. However, purchasing a separate trailer jack is an undesired expense if a jack is already installed on the trailer. Having the ability to relocate the existing trailer jack to another location is more desirable.

American Car Craft (Hudson, Fla.) manufactures a product called a "Jack Back" which will relocate a tongue jack back further from the hitch ball coupler to avoid contact with the tailgate. The Jack Back is a triangular shaped metal plate that is bolted to the top of the trailer frame. Mounting the plate requires drilling holes through the side rails forming the trailer nose area. While the Jack Back device tries to solve the problem of contact with the tailgate, it can only be used on A-frame trailers, lacks versatility in terms of placement of the jack, requires drilling into the trailer frame, and is somewhat complicated to install.

In view of the problems and disadvantages associated with prior art devices, the present invention was conceived and one of its objectives is to provide a trailer tongue jack relocation bracket for convenient mounting to a trailer frame.

It is another objective of the present invention to provide a tongue jack relocation bracket that can be mounted to either the left or right tongue rail of a trailer frame.

It is still another objective of the present invention to provide a tongue jack relocation bracket that can be mounted to either the interior or the exterior of the tongue rail of a trailer frame.

It is a further objective of the present invention to provide a tongue jack relocation bracket that can be easily mounted to a trailer frame without any modifications to the trailer frame.

Various other objectives and advantages of the present invention will become apparent to those skilled in the art as a more detailed description is set forth below.

SUMMARY OF THE INVENTION

The aforesaid and other objectives are realized by providing in the preferred embodiment, a trailer tongue jack relocation bracket having a frame bracket, a central bracket, and a frame or backing plate. The central bracket is firmly attached to the frame bracket, such as by welding and has spaced-apart upper and lower plate members that can be used to mount a trailer tongue jack to the relocation bracket. The frame bracket and backing plate can be bolted together in a spaced apart, parallel orientation and can be placed on opposite sides of a trailer frame member to sandwich the frame member therebetween, and then bolted together to firmly clamp the relocation bracket to the trailer.

DETAILED DESCRIPTION OF THE PREFERRED EMBODIMENT AND OPERATION OF THE INVENTION

Figure 1:
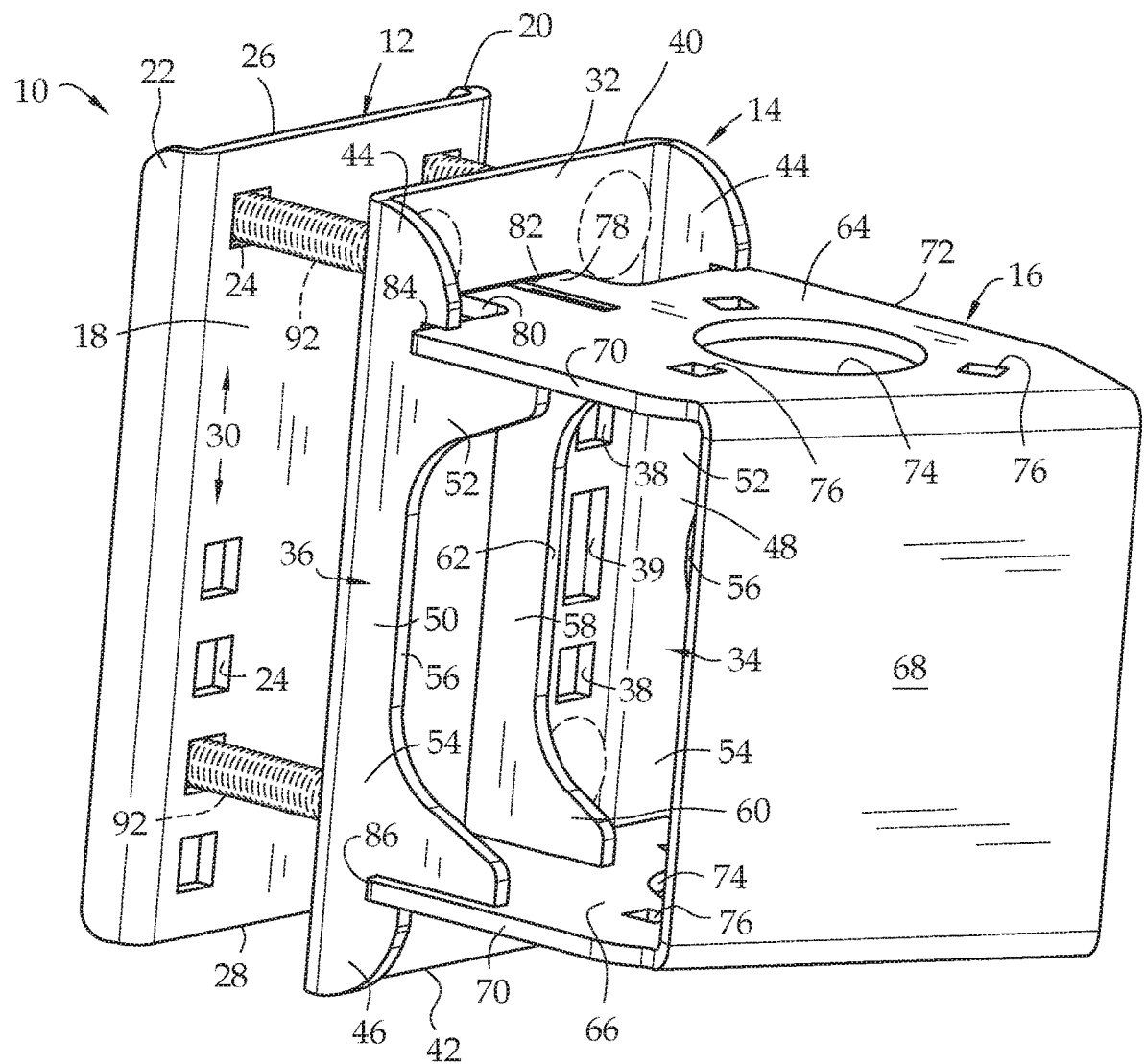
FIG. 1 illustrates a top-front perspective view of an embodiment of the trailer tongue jack relocation bracket in accordance with the invention.

For a better understanding of the invention and its operation, turning now to the drawings, the preferred embodiment of trailer tongue jack relocation bracket 10 illustrated therein includes a frame or backing plate 12, a frame bracket 14, and a central bracket 16.

Backing plate 12 is ideally a generally planar member defining a rectangular central section 18 with curved longitudinal edges 20, 22. Central section 18 may have a plurality of apertures 24 formed therein. In the embodiment(s) shown, the apertures 24 are preferably arranged in parallel, spaced-apart relation and proximate to the longitudinal edges 20, 22 of the backing plate 12.

Figure 2:
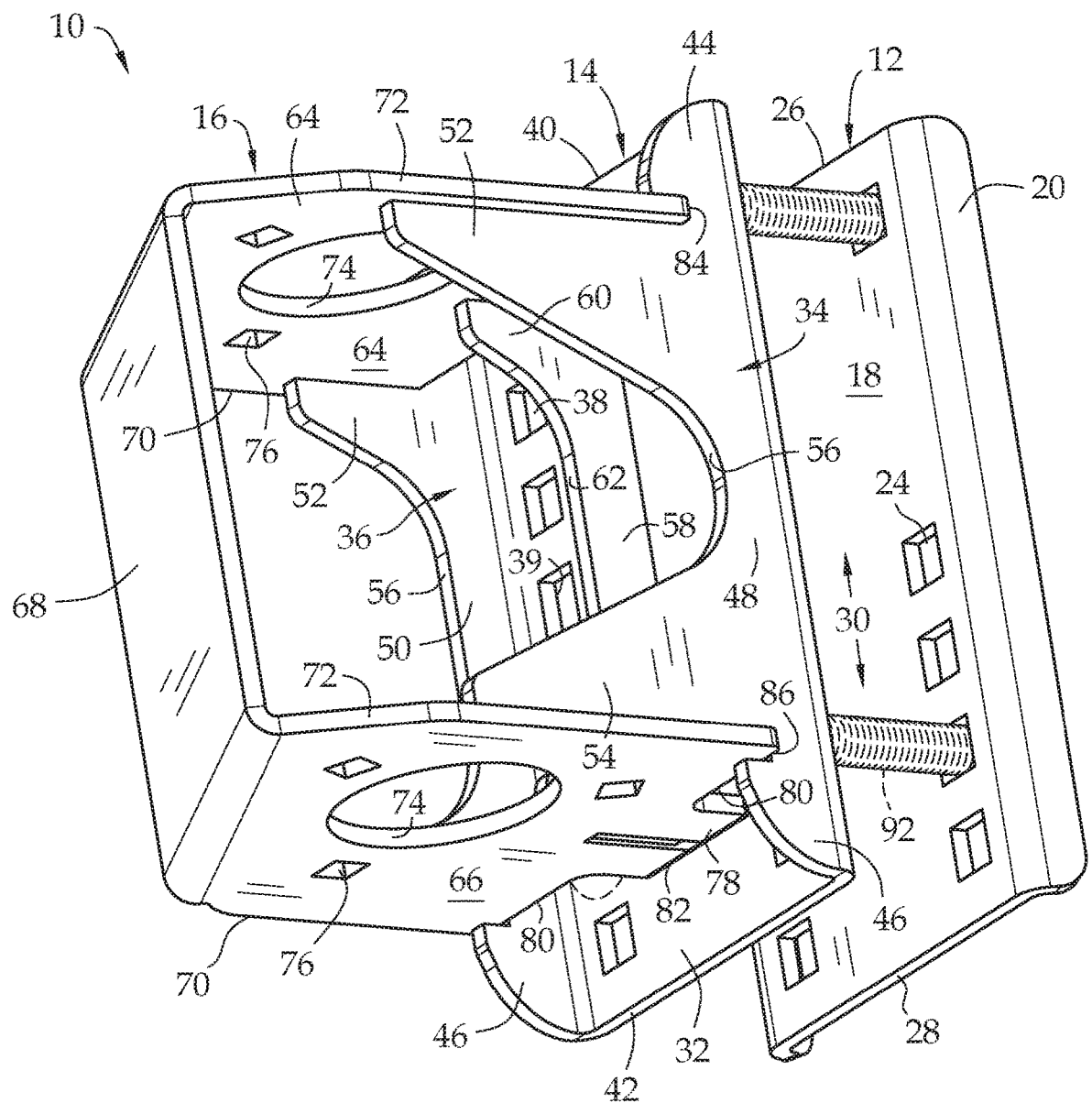
FIG. 2 shows a bottom-front perspective view of the relocation bracket of FIG. 1.
Figure 3:
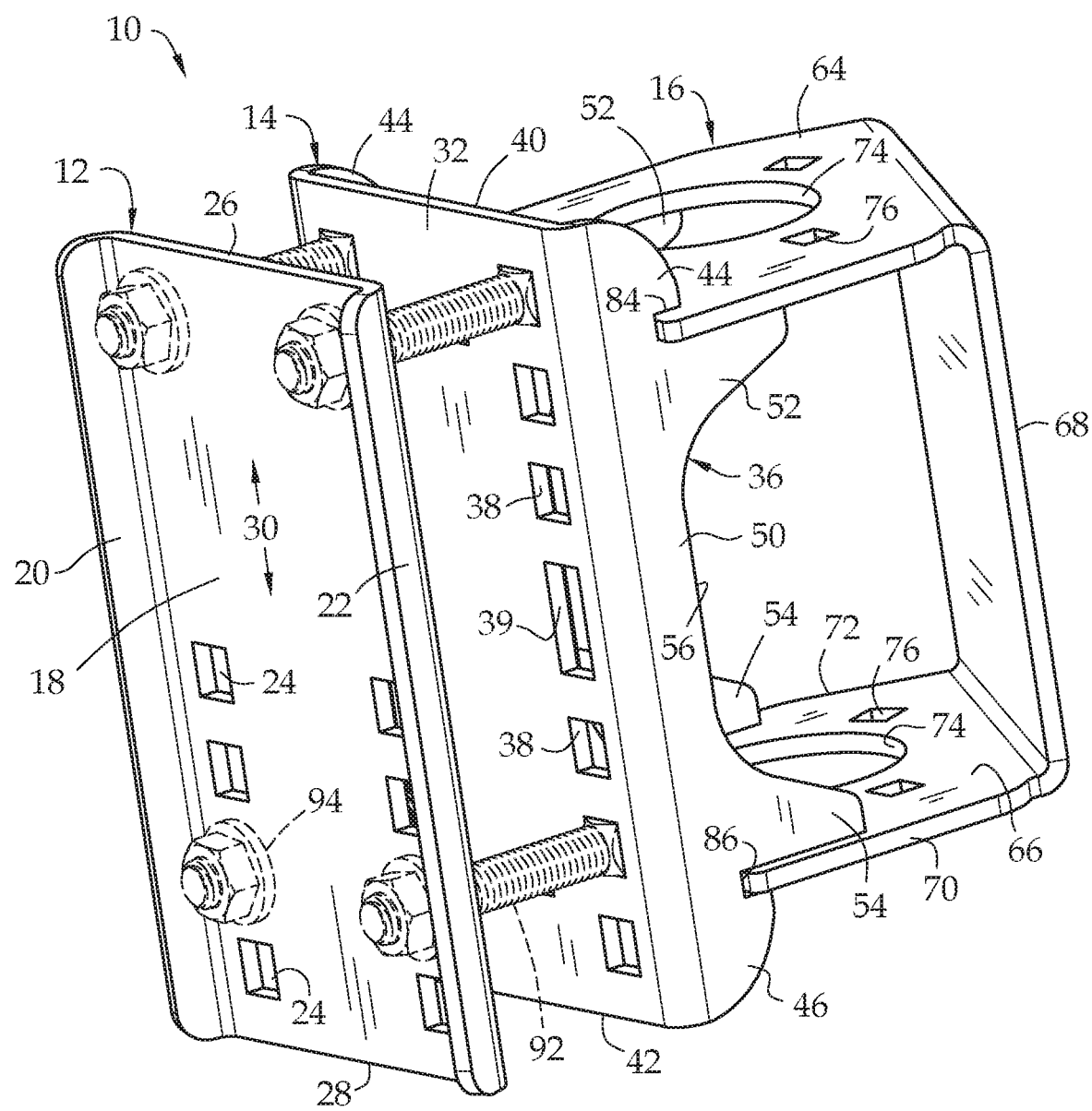
FIG. 3 depicts a back-top perspective view of the relocation bracket of FIG. 1.

As seen in in the embodiment in FIGS. 1-3, there is a discontinuity in spacing of the apertures in that a single pair of apertures 24 is located at the top 26 of backing plate 12 and a cluster of apertures 24 is located near the bottom 28 of backing plate 12. The discontinuity in spacing along the longitudinal dimension of the backing plate (indicated by arrow 30), as will be explained more fully later below, facilitates use of the relocation bracket 10 with trailers having different sized frames. While it would be possible to have a continuous row of equally-spaced apertures 24 along each of the longitudinal edges 20, 22 of frame plate 12, this is not preferred because the additional apertures 24 could weaken the backing plate 12 and compromise the integrity of relocation bracket 10, which in turn, could require use of heavier gauge materials.

Backing plate 12 is preferably made of steel and could be formed, for example, by a stamping operation. Because the relocation bracket is intended for use while exposed to the environment, the steel is preferably powder coated, galvanized or otherwise treated to improve weather-resistance. In one preferred embodiment, the rectangular center section 18 of backing plate 12 measures approximately 8 inches×4 inches with the longitudinal edges 20, 22 oriented at an angle of about 70 degrees (no more than +/−5 degrees, and more preferably +/−2 degrees) relative to the plane of the rectangular center section 18. The apertures 24 are each preferably of square configuration with dimensions of about 0.5-0.6 inch. The frame bracket 14, like backing plate 12, is a generally planar section having a rectangular central section 32 with a pair of turned longitudinal side members 34, 36. Central section 32 preferably defines a plurality of apertures 38, 39. In the embodiment shown, the apertures 38, 39 are arranged in parallel, spaced-apart relation and proximate to the longitudinal sides 34, 36 of the frame bracket 14.

As also seen in FIGS. 1-3, in the embodiment there is a discontinuity in sizing of the apertures, in that a pair of apertures 39 located at the general center between the top 40 of frame bracket 14 and the bottom 42 of frame bracket 14 are rectangular shaped whereas the remaining apertures 38 may be square, as best seen in FIG. 3.

One feature of the preferred embodiment is that the relocation bracket can be used on either the inside or outside of a conventional trailer frame rail and can be used on either the right or left side of the trailer. The rectangular shaped aperture 39 in the center of the rectangular central section 32 of frame bracket 14 ensures that the aperture 39 will align with the corresponding aperture 24 in the rectangular center section 18 of backing plate 12 when the relocation bracket 10 is affixed to a trailer rail, even if the frame bracket 14 and central bracket 16 is/are inverted 180 degrees from the orientation shown.

The longitudinal sides 34, 36 of frame bracket 14 are irregular shaped members. Each longitudinal side 34, 36 has a shoulder section 44, 46 located at the top 40 and bottom 42 of frame bracket 14, respectively. The shoulder section 44 is preferably rounded to eliminate sharp edges that pose safety risks to the user. A radius of 1 inch for the rounding is particularly preferred.

Located between the top and bottom shoulder sections 44, 46 on each of longitudinal sides 34, 36 is ideally a web section 48, 50, respectively. Each web section 48, 50 has a first horizontal leg 52 located near the top 40 of frame bracket 14 and a second horizontal leg 54 located near the bottom 42 of frame bracket 14. Located between the first and second horizontal legs 52, 54 is an arcuate cutout 56. The horizontal legs 52, 54 of web section 48 are longer than those of web section 50, resulting in a deeper arcuate cutout 56 on web 48 as compared to web 50 which has a shallower cutout 56. In a particular preferred embodiment, the distance between the rectangular center section 32 and the tip of the horizontal legs 52, 54 on web section 48 is about 4 inches, whereas the distance to the tip of the horizontal legs on web section 50 is about 2 inches.

Frame bracket 14 may further include a central web section 58, generally centered on the rectangular center section 32 between the longitudinal sides 34, 36. Like web sections 48, 50, central web section 58 has horizontal leg sections 60 located near the top 40 and bottom 42 of the frame bracket 14 spaced apart by an arcuate cutout 62. Horizontal leg sections 60 of the central web section 58 may extend about 1 inch from the rectangular central section 32 of frame bracket 14 in a preferred embodiment. Web sections 48, 50 and 58 provide rigidity and strength to the frame bracket 14. Frame bracket 14 is preferably made of steel and could be formed, for example, by a stamping operation and central web section 58 may be affixed by welding. Because the relocation bracket is intended for use while exposed to the environment, the steel is preferably powder coated, galvanized or otherwise treated to improve weather-resistance.

In a particularly preferred embodiment, the rectangular center section 32 of frame bracket 14 measures approximately 8 inches×4 inches. The longitudinal sides 34, 36 are oriented at an angle of about 90 degrees relative to the plane of the rectangular center section 32. The apertures 38 are each preferably of square configuration with dimensions of about 0.5-0.6 inch, and apertures 39 are preferably rectangular with dimensions of about 0.5-0.6 inch×1-1.2 inch.

Figure 4:
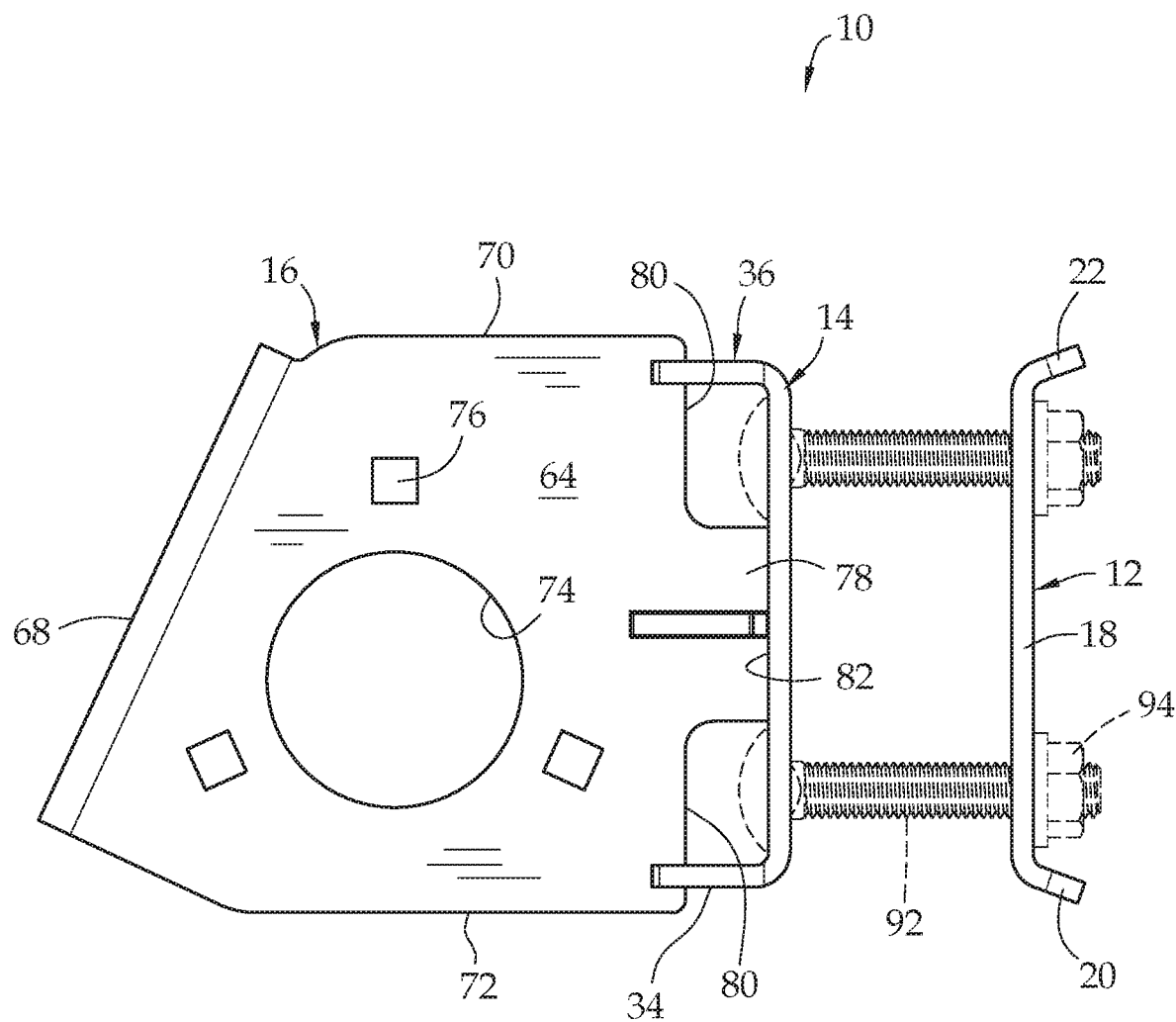
FIG. 4 pictures a top plan view of the relocation bracket of FIG. 1.
Figure 5:
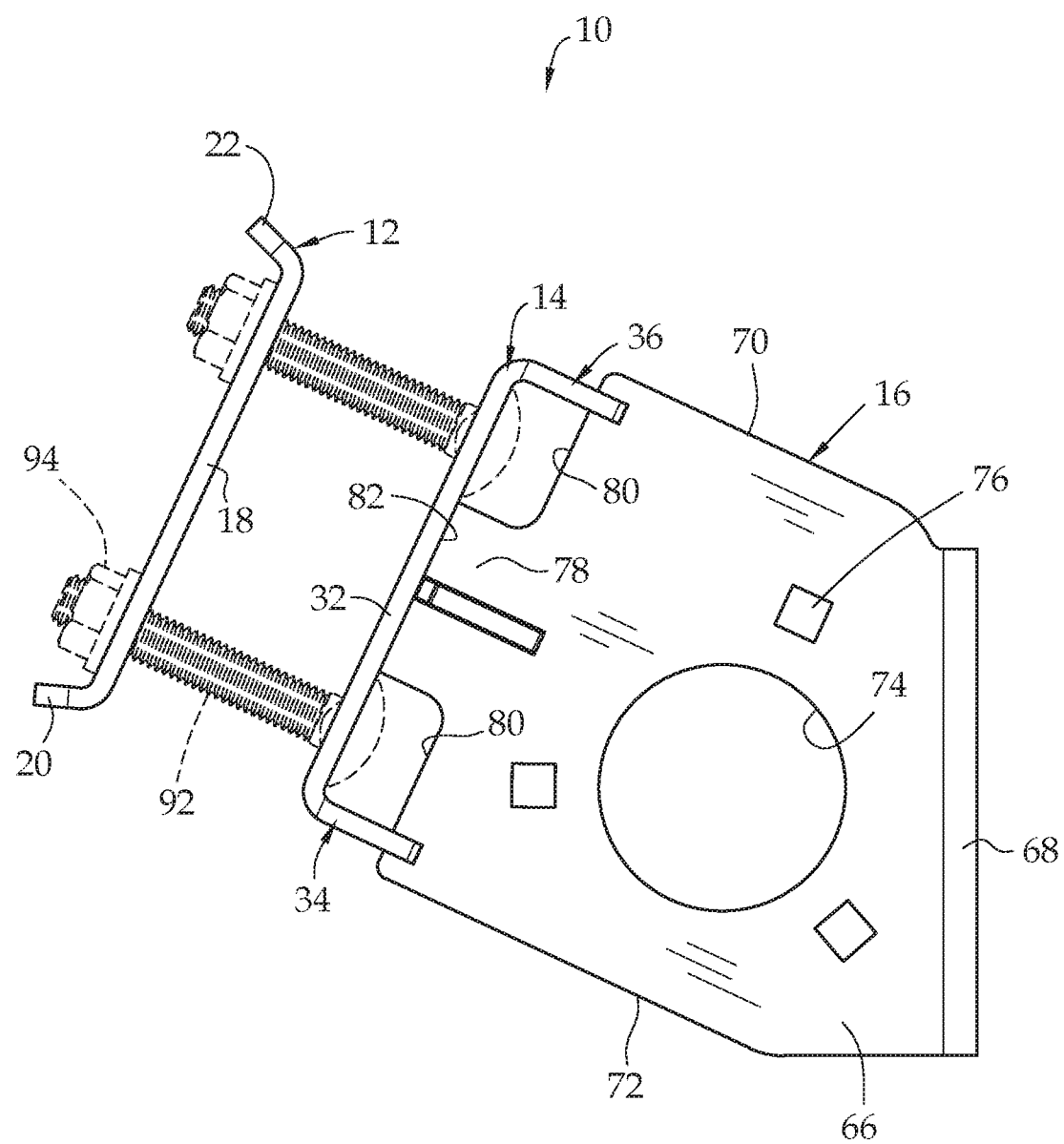
FIG. 5 features a bottom plan view of the relocation bracket of FIG. 1.

The preferred central bracket 16 is a U-shaped member having a top plate 64, a bottom plate 66, and a side plate 68. Top plate 64 and bottom plate 66 are disposed generally parallel to one another and generally perpendicular to side plate 68. The top and bottom plates 64, 66, as best seen in FIGS. 4 and 5, have a generally trapezoidal shape, with a front edge 70 that is shorter than the rear edge 72, providing the preferred relocation bracket 10 with an overall wedge-shaped appearance. Top plate 64 and bottom plate 66 each have a circular opening 74 and a plurality of apertures 76 spaced about the circular opening 74. Circular opening 74 has a diameter of about 2.2-2.4 inches and is centered about 3.5 inches from the rectangular center 32 of frame bracket 14 and about 6.4 inches from the front edge 70 of central bracket 16. The apertures 76 are arranged to permit attachment of a tongue jack to the central bracket 16, which is typically in a triangular pattern. Top plate 64 is essentially a mirror image of bottom plate 66, whereby the relocation bracket 10 can be used in the orientation shown or rotated 180 degrees.

The top and bottom plates 64, 66 each may have a tab 78 located on an edge of the top and bottom plates opposite the side plate 68. The tab is preferably defined by cutouts 80 located on either side of the tab 78. The tab 78 fits within a corresponding slot 82 in the rectangular center section 32 of frame bracket 14, as best seen in FIGS. 1 and 2. Top plate 64 rests in a notch 84 formed between shoulder 44 and web sections 48, 50 and bottom plate 66 rests in a notch 86 formed between shoulder 46 and web sections 48, 50. Central bracket 16 is securely affixed to the frame bracket 14, such as by welding so that the frame bracket 14 and central bracket 16 is a unitary structural member.

Figure 6:
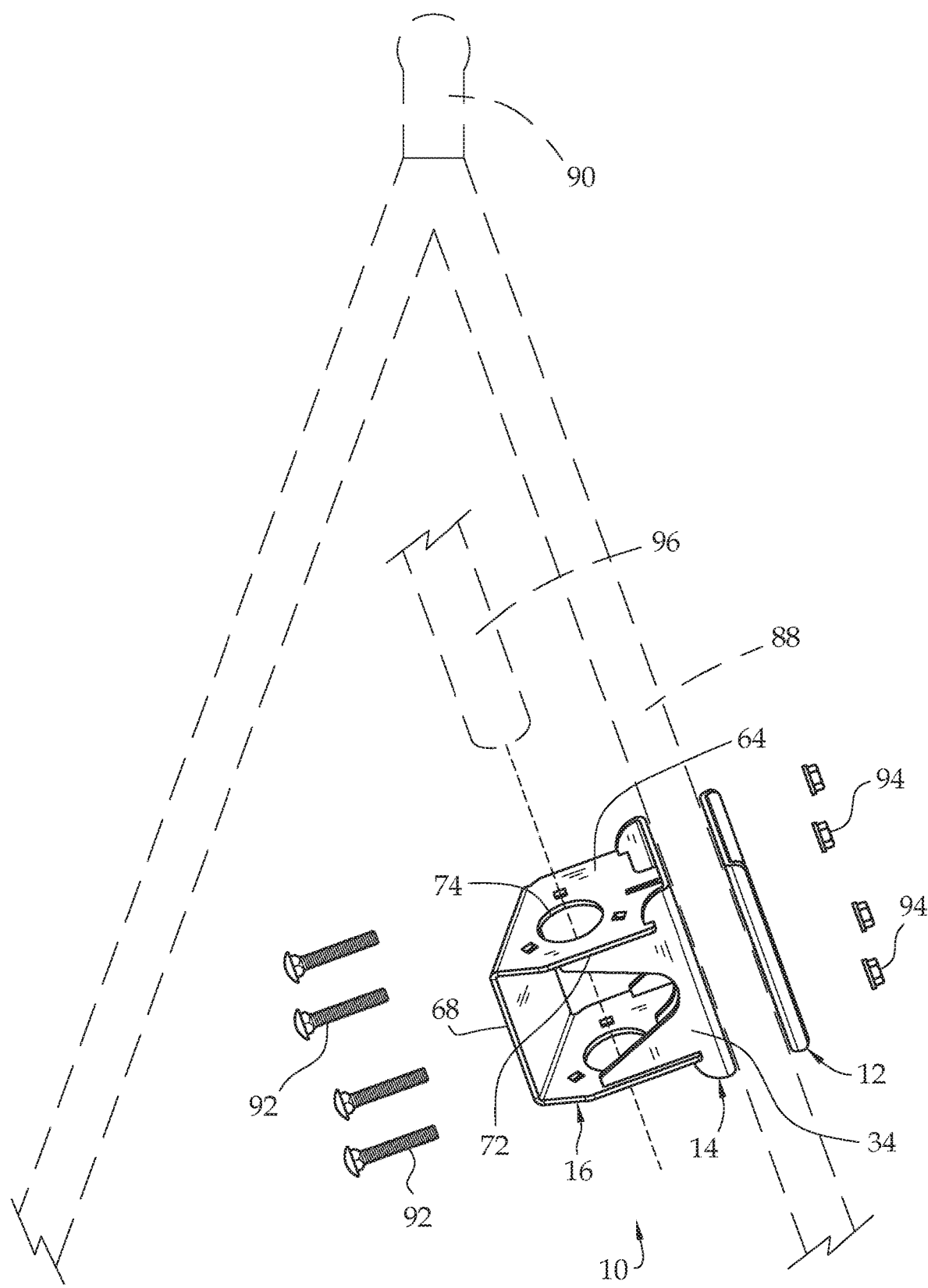
FIG. 6 demonstrates an exploded perspective view, partly fragmented and partly in phantom, of the relocation bracket shown in context of use on a trailer frame.

As noted, the relocation bracket can be affixed to the trailer frame on either the right or left side of the trailer and on either the inside or outside surface of the trailer frame member. More importantly the relocation bracket can be affixed without any modifications to the trailer frame. With reference to FIG. 6, the frame plate 12 is placed on one side of the trailer frame member 88 and the frame bracket 14/central bracket 16 is/are placed on the opposite side of the trailer frame member. The wedge-shaped appearance of frame bracket 14/central bracket 16 mimics the shape of a typical trailer tongue area having converging frame members 88. Accordingly, in a preferred mode the frame bracket 14/central bracket 16 is/are oriented with the front edge 70 oriented toward the hitch ball coupler 90 and the rear edge 72 oriented toward the rear of the trailer. Once the frame plate 12 and frame bracket 14/central bracket 16 are arranged on opposite sides of the trailer frame member 88, they are secured together with appropriate fasteners, such as carriage bolts 92 and nuts 94 (shown in phantom in FIGS. 1-5) whereby the trailer frame member 88 is sandwiched between the frame plate 12 and the frame bracket 14/central bracket 16. The carriage bolts 92 are preferably placed in the apertures 24/38/39 that most closely correspond to the dimension of the trailer frame member 88 so that the vertical distance between the upper carriage bolts and the lower carriage bolts is at the minimum needed to clear the frame member 88. A trailer jack 96 is then attached to the central bracket 16 by inserting the cylinder of the jack into circular opening 74 and securing the flange of trailer jack 96 to either the top plate 64 or bottom plate 66 of the central bracket 16 with suitable fasteners (not shown).

In the drawings and specification there has been set forth a preferred embodiment of the invention, and although specific terms have been employed, they are used in a generic and descriptive sense only and not for purposes of limitation, the scope of the invention being defined in the claims. Modifications and alternatives that may suggest themselves to those skilled in the art upon reading the foregoing disclosure are intended to be considered within the scope of the invention.

We claim:

1. A relocation bracket comprising a frame plate, a frame bracket and a central bracket; the frame plate comprising a generally planar member with a plurality of apertures; the frame bracket comprising a generally planar section and a pair of longitudinal sides comprising at least one web section, the generally planar section of the frame bracket having a plurality of apertures; the central bracket comprising a top plate, a bottom plate, and a side plate; the top plate and the bottom plate each defining a central opening sized to receive a trailer jack therein, wherein the frame bracket and the central bracket are firmly affixed together forming a unified structural member; wherein the generally planar section of the frame bracket comprises a rectangular center section containing the plurality of apertures; wherein the plurality of apertures in the rectangular center section of the frame bracket are arranged in two parallel, spaced-apart rows, each row being proximate to the longitudinal sides of the frame bracket; wherein the plurality of apertures in the rectangular center section of the frame bracket comprise a single pair of spaced-apart apertures located at a general center of the rectangular center section of the frame bracket between a top of the frame bracket and a bottom of the frame bracket.

2. The relocation bracket of claim 1, wherein the frame plate comprises a rectangular center section and curved longitudinal edges and wherein the plurality of apertures in the frame plate are arranged in two parallel spaced-apart rows, each row adjacent to a respective one of the curved longitudinal edges.

3. The relocation bracket of claim 1, wherein the frame plate comprises a rectangular center section and curved longitudinal edges and wherein the curved longitudinal edges are disposed at an angle of about seventy degrees relative to the rectangular center section of the frame plate.

4. The relocation bracket of claim 1, wherein the frame plate comprises a rectangular center section and curved longitudinal edges and wherein the plurality of apertures in the frame plate are arranged in two parallel spaced-apart rows, each row adjacent to a respective one of the curved longitudinal edges; the plurality of apertures in the frame plate comprising a discontinuity in vertical spacing of the plurality of apertures with a single pair of spaced-apart apertures at a top of the rectangular center section of the frame plate and a series of spaced-apart apertures located at a bottom of the rectangular center section of the frame plate.

5. The relocation bracket of claim 1, wherein the frame plate comprises a rectangular center section and curved longitudinal edges and wherein the plurality of apertures in the frame plate are arranged in two parallel spaced-apart rows, each row adjacent to a respective one of the curved longitudinal edges and wherein the plurality of apertures in the frame plate are of equal size and shape.

6. The relocation bracket of claim 1, wherein the at least one web section is oriented generally perpendicular to the rectangular center section of the frame bracket and is fixedly secured to the top and bottom plates.

7. The relocation bracket of claim 1, wherein the plurality of apertures in the rectangular center section of the frame bracket are of non-uniform size and shape.

8. The relocation bracket of claim 1, wherein the longitudinal sides of the frame bracket are irregular shaped members, each of the longitudinal sides having a shoulder section located at the top and the bottom of the frame bracket, wherein the at least one web section of the longitudinal side is located between the top and the bottom shoulder sections.

9. The relocation bracket of claim 1, wherein the frame bracket further comprises a central web section generally centered on the rectangular center section of the frame bracket between the longitudinal sides; the central web section has horizontal leg sections located near the top and a bottom of the frame bracket spaced apart by an arcuate cutout.

10. The relocation bracket of claim 1, wherein the top plate and the bottom plate of the central bracket are disposed generally parallel to one another and generally perpendicular to the side plate.

11. The relocation bracket of claim 1, wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening; the top plate and the bottom plate each have a tab located on an edge of the top plate and the bottom plate opposite the side plate, the tab being defined by cutouts located on either side of the tab; the tab fits within a corresponding slot in the rectangular center section of the frame bracket.

12. The relocation bracket of claim 1, wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening, the top plate and the bottom plate each have a tab located on an edge of the top plate and the bottom plate opposite the side plate, the tab being defined by cutouts located on either side of the tab; the tab fits within a corresponding slot in the rectangular center section of the frame bracket; the top plate and the bottom plate resting in notches formed in the longitudinal sides of the frame bracket.

13. A relocation bracket comprising a frame plate, a frame bracket and a central bracket; the frame plate comprising a generally planar member with a plurality of apertures; the frame bracket comprising a generally planar section and a pair of longitudinal sides comprising at least one web section, the generally planar section of the frame bracket having a plurality of apertures; the central bracket comprising a top plate, a bottom plate, and a side plate; the top plate and the bottom plate each defining a central opening sized to receive a trailer jack therein, wherein the frame bracket and the central bracket are firmly affixed together forming a unified structural member; wherein the at least one web section has a first horizontal leg located near a top of the frame bracket and a second horizontal leg located near a bottom of the frame bracket and an arcuate cutout separating the first horizontal leg and second horizontal leg.

14. The relocation bracket of claim 13, wherein the frame plate comprises a rectangular center section and curved longitudinal edges and wherein the plurality of apertures in the frame plate are arranged in two parallel spaced-apart rows, each row adjacent to a respective one of the curved longitudinal edges.

15. The relocation bracket of claim 13, wherein the frame plate comprises a rectangular center section and curved longitudinal edges and wherein the curved longitudinal edges are disposed at an angle of about seventy degrees relative to the rectangular center section.

16. The relocation bracket of claim 13, wherein the frame plate comprises a rectangular center section and curved longitudinal edges and wherein the plurality of apertures in the frame plate are arranged in two parallel spaced-apart rows, each row adjacent to a respective one of the curved longitudinal edges; the plurality of apertures in the frame plate comprising a discontinuity in vertical spacing of the plurality of apertures with a single pair of spaced-apart apertures at a top of the rectangular center section and a series of spaced-apart apertures located at a bottom of the rectangular center section.

17. The relocation bracket of claim 13, wherein the frame plate comprises a rectangular center section and curved longitudinal edges and wherein the plurality of apertures in the frame plate are arranged in two parallel spaced-apart rows, each row adjacent to a respective one of the curved longitudinal edges and wherein the plurality of apertures in the frame plate are of equal size and shape.

18. The relocation bracket of claim 13, wherein the generally planar section of the frame bracket comprises a rectangular center section; wherein the at least one web section is oriented generally perpendicular to the rectangular center section and is fixedly secured to the top and bottom plates.

19. The relocation bracket of claim 13, wherein the generally planar section of the frame bracket comprises a rectangular center section containing the plurality of apertures;
wherein the plurality of apertures in the rectangular center section of the frame bracket are arranged in two parallel, spaced-apart rows, each row being proximate to the longitudinal sides of the frame bracket.

20. The relocation bracket of claim 13, wherein the generally planar section of the frame bracket comprises a rectangular center section containing the plurality of apertures; wherein the plurality of apertures in the rectangular center section of the frame bracket are arranged in two parallel, spaced-apart rows, each row being proximate to the longitudinal sides of the frame bracket; wherein the plurality of apertures in the rectangular center section of the frame bracket are of non-uniform size and shape.

21. The relocation bracket of claim 13, wherein the longitudinal sides of the frame bracket are irregular shaped members, each of the longitudinal sides having a shoulder section located at the top and the bottom of the frame bracket, wherein the at least one web section of the longitudinal side is located between the top and the bottom shoulder sections.

22. The relocation bracket of claim 13, wherein the generally planar section of the frame bracket comprises a rectangular center section containing the plurality of apertures; the frame bracket further comprising a central web section generally centered on the rectangular center section of the frame bracket between the longitudinal sides; the central web section has horizontal leg sections located near the top and the bottom of the frame bracket spaced apart by an arcuate cutout.

23. The relocation bracket of claim 13, wherein the top plate and the bottom plate of the central bracket are disposed generally parallel to one another and generally perpendicular to the side plate.

24. The relocation bracket of claim 13, wherein the top plate and the bottom plate are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening; the top plate and the bottom plate each have a tab located on an edge of the top plate and the bottom plate opposite the side plate, the tab being defined by cutouts located on either side of the tab; the tab fits within a corresponding slot in the rectangular center section of the frame bracket.

25. The relocation bracket of claim 13, wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening, the top plate and the bottom plate each have a tab located on an edge of the top plate and the bottom plate opposite the side plate, the tab being defined by cutouts located on either side of the tab; the tab fits within a corresponding slot in the rectangular center section of the frame bracket; the top plate and the bottom plate resting in notches formed in the longitudinal sides of the frame bracket.

26. A relocation bracket comprising a frame plate, a frame bracket and a central bracket; the frame plate comprising a generally planar member with a plurality of apertures; the frame bracket comprising a generally planar section and a pair of longitudinal sides comprising at least one web section, the generally planar section of the frame bracket having a plurality of apertures; the central bracket comprising a top plate, a bottom plate, and a side plate; the top plate and the bottom plate each defining a central opening sized to receive a trailer jack therein, wherein the frame bracket and the central bracket are firmly affixed together forming a unified structural member; wherein the generally planar section of the frame bracket comprises a rectangular center section containing the plurality of apertures; the frame bracket further comprising a central web section generally centered on the rectangular center section between the longitudinal sides.

27. The relocation bracket of claim 26, wherein the frame plate comprises a rectangular center section and curved longitudinal edges and wherein the plurality of apertures in the frame plate are arranged in two parallel spaced-apart rows, each row adjacent to a respective one of the curved longitudinal edges.

28. The relocation bracket of claim 26, wherein the frame plate comprises a rectangular center section and curved longitudinal edges and wherein the curved longitudinal edges are disposed at an angle of about seventy degrees relative to the rectangular center section of the frame plate.

29. The relocation bracket of claim 26, wherein the frame plate comprises a rectangular center section and curved longitudinal edges and wherein the plurality of apertures in the frame plate are arranged in two parallel spaced-apart rows, each row adjacent to a respective one of the curved longitudinal edges; the plurality of apertures in the frame plate comprising a discontinuity in vertical spacing of the plurality of apertures with a single pair of spaced-apart apertures at a top of the rectangular center section of the frame plate and a series of spaced-apart apertures located at a bottom of the rectangular center section of the frame plate.

30. The relocation bracket of claim 26, wherein the frame plate comprises a rectangular center section and curved longitudinal edges and wherein the plurality of apertures in the frame plate are arranged in two parallel spaced-apart rows, each row adjacent to a respective one of the curved longitudinal edges and wherein the plurality of apertures in the frame plate are of equal size and shape.

31. The relocation bracket of claim 26, wherein the at least one web section is oriented generally perpendicular to the rectangular center section of the frame bracket and is fixedly secured to the top and bottom plates.

32. The relocation bracket of claim 26, wherein the plurality of apertures in the rectangular center section of the frame bracket are arranged in two parallel, spaced-apart rows, each row being proximate to the longitudinal sides of the frame bracket.

33. The relocation bracket of claim 26, wherein the plurality of apertures in the rectangular center section of the frame bracket are arranged in two parallel, spaced-apart rows, each row being proximate to the longitudinal sides of the frame bracket; wherein the plurality of apertures in the rectangular center section of the frame bracket are of non-uniform size and shape.

34. The relocation bracket of claim 26, wherein the longitudinal sides of the frame bracket are irregular shaped members, each of the longitudinal sides having a shoulder section located at a top and a bottom of the frame bracket, wherein the at least one web section of the longitudinal side is located between the top and the bottom shoulder sections.

35. The relocation bracket of claim 26, wherein the central web section has horizontal leg sections located near a top and a bottom of the frame bracket spaced apart by an arcuate cutout.

36. The relocation bracket of claim 26, wherein the top plate and the bottom plate of the central bracket are disposed generally parallel to one another and generally perpendicular to the side plate.

37. The relocation bracket of claim 26, wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening; the top plate and the bottom plate each have a tab located on an edge of the top plate and the bottom plate opposite the side plate, the tab being defined by cutouts located on either side of the tab; the tab fits within a corresponding slot in the rectangular center section of the frame bracket.

38. The relocation bracket of claim 26, wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening, the top plate and the bottom plate each have a tab located on an edge of the top plate and the bottom plate opposite the side plate, the tab being defined by cutouts located on either side of the tab; the tab fits within a corresponding slot in the rectangular center section of the frame bracket; the top plate and the bottom plate resting in notches formed in the longitudinal sides of the frame bracket.

39. A relocation bracket comprising a frame plate, a frame bracket and a central bracket; the frame plate comprising a generally planar member with a plurality of apertures; the frame bracket comprising a generally planar section and a pair of longitudinal sides comprising at least one web section, the generally planar section of the frame bracket having a plurality of apertures; the central bracket comprising a top plate, a bottom plate, and a side plate; the top plate and the bottom plate each defining a central opening sized to receive a trailer jack therein, wherein the frame bracket and the central bracket are firmly affixed together forming a unified structural member; wherein the top plate and the bottom plate of the central bracket are disposed generally parallel to one another and generally perpendicular to the side plate; the top plate and the bottom plate each have a generally trapezoidal shape, with a front edge that is shorter than a rear edge; the top plate and the bottom plate each have a circular opening and a plurality of apertures spaced about the circular opening.

40. The relocation bracket of claim 39, wherein the frame plate comprises a rectangular center section and curved longitudinal edges and wherein the plurality of apertures in the frame plate are arranged in two parallel spaced-apart rows, each row adjacent to a respective one of the curved longitudinal edges.

41. The relocation bracket of claim 39, wherein the frame plate comprises a rectangular center section and curved longitudinal edges and wherein the curved longitudinal edges are disposed at an angle of about seventy degrees relative to the rectangular center section of the frame plate.

42. The relocation bracket of claim 39, wherein the frame plate comprises a rectangular center section and curved longitudinal edges and wherein the plurality of apertures in the frame plate are arranged in two parallel spaced-apart rows, each row adjacent to a respective one of the curved longitudinal edges; the plurality of apertures in the frame plate comprising a discontinuity in vertical spacing of the plurality of apertures with a single pair of spaced-apart apertures at a top of the rectangular center section of the frame plate and a series of spaced-apart apertures located at a bottom of the rectangular center section of the frame plate.

43. The relocation bracket of claim 39, wherein the frame plate comprises a rectangular center section and curved longitudinal edges and wherein the plurality of apertures in the frame plate are arranged in two parallel spaced-apart rows, each row adjacent to a respective one of the curved longitudinal edges and wherein the plurality of apertures in the frame plate are of equal size and shape.

44. The relocation bracket of claim 39, wherein the generally planar section of the frame bracket comprises a rectangular center section; wherein the at least one web section is oriented generally perpendicular to the rectangular center section of the frame bracket and is fixedly secured to the top and bottom plates.

45. The relocation bracket of claim 39, wherein the generally planar section of the frame bracket comprises a rectangular center section containing the plurality of apertures; wherein the plurality of apertures in the rectangular center section of the frame bracket are arranged in two parallel, spaced-apart rows, each row being proximate to the longitudinal sides of the frame bracket.

46. The relocation bracket of claim 39, wherein the generally planar section of the frame bracket comprises a rectangular center section containing the plurality of apertures; wherein the plurality of apertures in the rectangular center section of the frame bracket are arranged in two parallel, spaced-apart rows, each row being proximate to the longitudinal sides of the frame bracket; wherein the plurality of apertures in the rectangular center section of the frame bracket are of non-uniform size and shape.

47. The relocation bracket of claim 39, wherein the longitudinal sides of the frame bracket are irregular shaped members, each of the longitudinal sides having a shoulder section located at a top and a bottom of the frame bracket, wherein the at least one web section of the longitudinal side is located between the top and the bottom shoulder sections.

48. The relocation bracket of claim 39, wherein the generally planar section of the frame bracket comprises a rectangular center section containing the plurality of apertures; the frame bracket further comprising a central web section generally centered on the rectangular center section of the frame bracket between the longitudinal sides; the central web section has horizontal leg sections located near a top and a bottom of the frame bracket spaced apart by an arcuate cutout.

49. The relocation bracket of claim 39, wherein the top plate and the bottom plate each have a tab located on an edge of the top plate and the bottom plate opposite the side plate, the tab being defined by cutouts located on either side of the tab; the tab fits within a corresponding slot in the rectangular center section of the frame bracket.

50. The relocation bracket of claim 39, wherein the top plate and the bottom plate each have a tab located on an edge of the top plate and the bottom plate opposite the side plate, the tab being defined by cutouts located on either side of the tab; the tab fits within a corresponding slot in the rectangular center section of the frame bracket; the top plate and the bottom plate resting in notches formed in the longitudinal sides of the frame bracket.

\* \* \* \* \*